(12) United States Patent
Tanpure et al.

(10) Patent No.: US 11,599,339 B2
(45) Date of Patent: Mar. 7, 2023

(54) CREATING USER EXPERIENCE DESIGNS

(71) Applicant: International Business Machines Corporation, Armonk, NY (US)

(72) Inventors: Manali Tanpure, Pune (IN); Akash U. Dhoot, Pune (IN); Venkata Vara Prasad Karri, Visakhapatnam (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/211,228

(22) Filed: Mar. 24, 2021

(65) Prior Publication Data
US 2022/0308843 A1 Sep. 29, 2022

(51) Int. Cl.
*G06F 8/38* (2018.01)
(52) U.S. Cl.
CPC ...................... *G06F 8/38* (2013.01)
(58) Field of Classification Search
CPC .......................................................... G06F 8/38
See application file for complete search history.

(56) References Cited

U.S. PATENT DOCUMENTS

| | | | | |
|---|---|---|---|---|
| 2008/0313650 | A1* | 12/2008 | Arnquist | G06F 9/451 719/316 |
| 2010/0175044 | A1* | 7/2010 | Doddavula | G06F 8/38 717/104 |
| 2018/0074659 | A1 | 3/2018 | Anderson et al. | |
| 2019/0369854 | A1 | 12/2019 | Torbey et al. | |

OTHER PUBLICATIONS

Hassenzahl, "User Experience and Experience Design" (Year: 2011).*
Subiyakto et al., "Redesigning User Interface Based on User Experience Using Goal-Directed Design Method" (Year: 2020).*
Gube et al., "What is User Experience Design? Overview, Tools and Resources" (Year: 2010).*
Lossini, "User Experience Design (UX Design) for an E-commerce website: a case of Shop the Planet" (Year: 2014).*

(Continued)

*Primary Examiner* — Phillip H Nguyen
(74) *Attorney, Agent, or Firm* — Robert A. Voigt, Jr.; Shackelford, Bowen, McKinley & Norton, LLP

(57) ABSTRACT

A computer-implemented method, system and computer program product for creating user experience designs. User requirements for creating user experience designs are gathered. After gathering the user requirements, such user requirements are analyzed in connection with historical user experience designs. A user experience flow is then derived based on these analyzed gathered user requirements. Furthermore, a theme for a user experience design is received. Additionally, a sketch (e.g., paper sketch of a user interface) is received from a user, which is transformed into a wireframe. User interface elements and components are then derived based on the derived user experience flow and the received theme. A user experience design is then generated in the wireframe based on these derived user interface elements and components. In this manner, user experience designs are created that can be used to create products that provide meaningful and relevant experiences to users.

20 Claims, 8 Drawing Sheets

(56) References Cited

OTHER PUBLICATIONS

Suraj Srinivasa, "Cognitivie Models for Better User Experience," Smashing Magazine, Aug. 27, 2018, pp. 1-5.
Nick Babich, "The 4 Golden Rules of UI Design," Adobe XD Ideas, October?, 2019, pp. 1-24.
Nick Babich, "A Comprehensive Guide to Product Design," Smashing Magazine, Jan. 31, 2018, pp. 1-44.

* cited by examiner

CREATING USER EXPERIENCE DESIGNS

TECHNICAL FIELD

The present disclosure relates generally to user experience (UX) design, and more particularly to creating user experience designs using derived UX flows and derived user interface elements and components.

BACKGROUND

User experience (UX) is a person's emotions and attitudes about using a particular product, system or service. It includes the practical, experiential, affective, meaningful, and valuable aspects of human-computer interaction and product ownership. Additionally, it includes a person's perceptions of system aspects, such as utility, ease of use, and efficiency. User experience may be subjective in nature to the degree that it is about individual perception and thought with respect to a product or system. User experience varies dynamically, constantly modifying over time due to changing usage circumstances. Simplified, user experience is about how a user interacts with, and experiences, a product.

User experience (UX) design is the process of supporting user behavior through usability, usefulness, and desirability provided in the interaction with a product. User experience design encompasses traditional human-computer interaction (HCI) design and extends it by addressing all aspects of a product or service as perceived by users. In other words, UX design is the process of designing (digital or physical) products that are useful, easy to use, and delightful to interact with. Such UX designs are used by design teams to create products that provide meaningful and relevant experiences to users.

SUMMARY

In one embodiment of the present disclosure, a computer-implemented method for creating user experience designs comprises gathering user requirements for creating user experience designs. The method further comprises analyzing the gathered user requirements in connection with historical user experience designs. The method additionally comprises deriving a user experience flow based on the analyzed gathered user requirements. Furthermore, the method comprises receiving a theme for a user experience design. Additionally, the method comprises receiving a sketch of a user interface. In addition, the method comprises transforming the sketch of the user interface into a wireframe. The method further comprises deriving user interface elements and components based on the derived user experience flow and the received theme for the user experience design. The method additionally comprises generating the user experience design in the wireframe based on the derived user interface elements and components.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
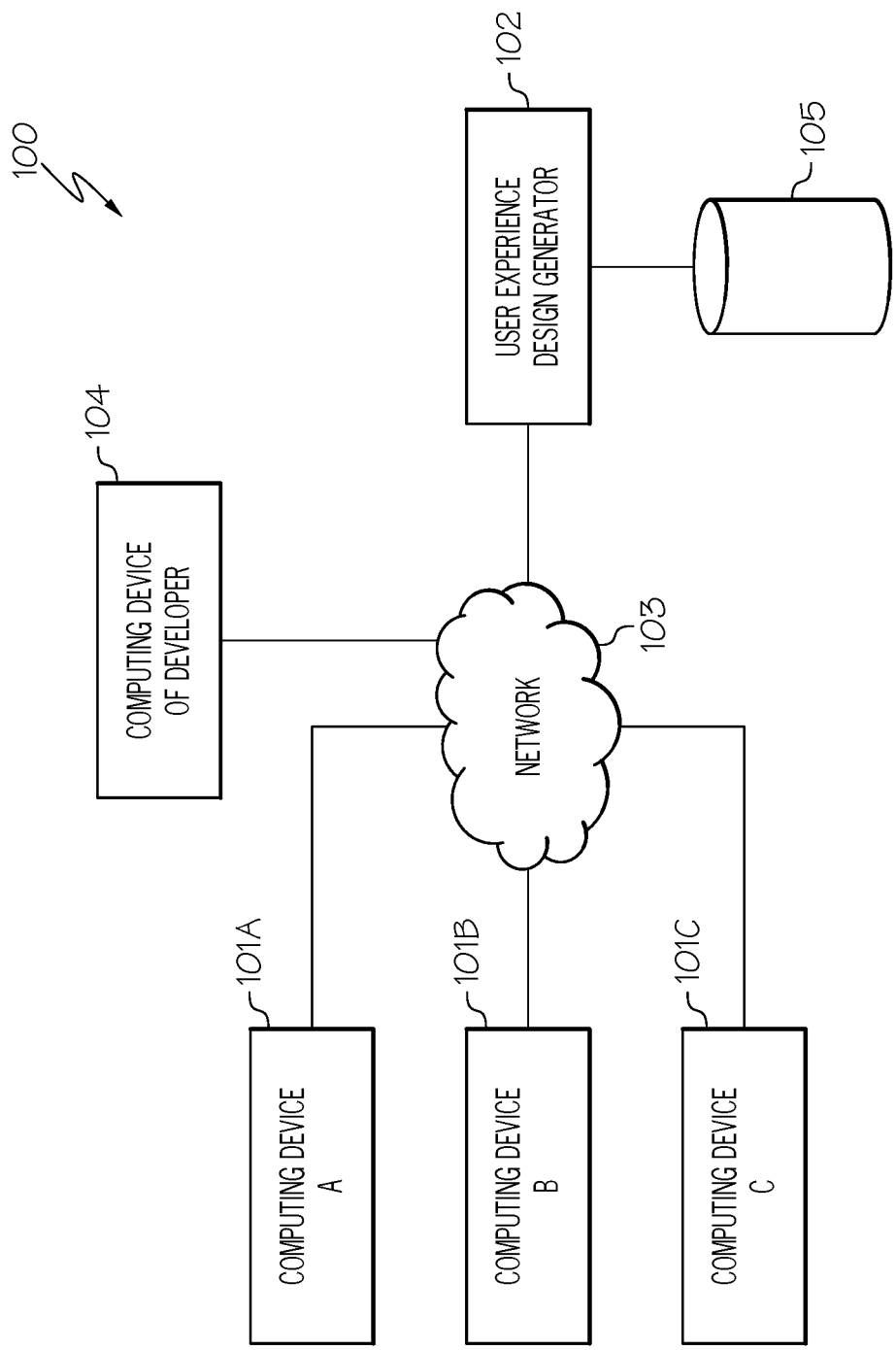
FIG. 1 illustrates a communication system for practicing the principles of the present disclosure in accordance with an embodiment of the present disclosure.

As stated in the Background section, user experience (UX) is a person's emotions and attitudes about using a particular product, system or service. It includes the practical, experiential, affective, meaningful, and valuable aspects of human-computer interaction and product ownership. Additionally, it includes a person's perceptions of system aspects, such as utility, ease of use, and efficiency. User experience may be subjective in nature to the degree that it is about individual perception and thought with respect to a product or system. User experience varies dynamically, constantly modifying over time due to changing usage circumstances. Simplified, user experience is about how a user interacts with, and experiences, a product.

User experience (UX) design is the process of supporting user behavior through usability, usefulness, and desirability provided in the interaction with a product. User experience design encompasses traditional human-computer interaction (HCI) design and extends it by addressing all aspects of a product or service as perceived by users. In other words, UX design is the process of designing (digital or physical) products that are useful, easy to use, and delightful to interact with. Such UX designs are used by design teams to create products that provide meaningful and relevant experiences to users.

Currently though such UX design processes have difficulty in gathering information to determine users' requirements in creating the UX design. Furthermore, such UX design processes fail to create the UX design taking into consideration the user's emotions and thought processes. Additionally, such UX design processes fail to discover user interface elements which align with such users' requirements and thought processes.

As a result, the currently created UX designs cannot effectively be used to create products that provide meaningful and relevant experiences to users.

The embodiments of the present disclosure provide a means for creating UX designs that can be used to create products that provide meaningful and relevant experiences to users by deriving user experience flows from gathered requirements of the user experience design and deriving user interface elements and components based on the derived user experience flows and theme selected by the user.

In some embodiments of the present disclosure, the present disclosure comprises a computer-implemented method, system and computer program product for creating user experience designs. In one embodiment of the present disclosure, user requirements for creating user experience designs are gathered. In one embodiment, such user requirements pertain to a defined business goal or problem/opportunity statement provided by a user. After gathering the user requirements, such user requirements are analyzed in connection with historical user experience designs. A user experience flow is then derived based on these analyzed gathered user requirements. A "user experience flow," as used herein, refers to a diagram that displays the complete path a user takes when using a product. The complete path may include steps performed by the user when using a product, such as a computing device to purchase an item sold on a website. In one embodiment, those historical user experience designs with a greater number of matching user requirements may be selected to be used to derive user experience flows over those with fewer number of matching user requirements. Furthermore, a theme for a user experience design is received. A "theme," as used herein, refers to the idea in or pervades the user experience design. For example, the user may select the theme of "flowers" in which user interface elements and components may include different flowers. Additionally, a sketch (e.g., paper sketch) is received from a user, which is transformed into a wireframe. A "wireframe," as used herein, is a diagram or a set of diagrams that consists of simple lines and shapes, such as representing a sketch provided by a user. For example, such a sketch could be an outline of a webpage or application. User interface elements and components are then derived based on the derived user experience flows and the received user selected theme. A user experience design is then generated in the wireframe based on these derived user interface elements and components. In this manner, the embodiments of the present disclosure provide a means for creating user experience designs that can be used to create products that provide meaningful and relevant experiences to users.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a device, referred to herein as the "user experience design generator" 102, via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and user experience design generator 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

User experience design generator 102 is configured to create user experience designs. Such user experience designs are created using derived user experience flows, derived user interface elements and components and derived wireframes from paper sketches. A description of these and other functions is provided further below. Furthermore, a description of the software components of user experience design generator 102 is provided below in connection with FIG. 2 and a description of the hardware configuration of user experience design generator 102 is provided further below in connection with FIG. 3.

Additionally, as shown in FIG. 1, a computing device 104 of a developer is connected to user experience design generator 102 via network 103. It is noted that both computing device 104 and the user (developer) of computing device 104 may be identified with element number 104. In one embodiment, user experience design generator 102 generates a draft of the user experience design that is reviewed and updated by the developer of computing device 104. In one embodiment, developer 104 provides audio-based instructions to user experience design generator 102 to update the draft of the user experience design, such as "add text area element next to element classified as Spider-Man." Such audio-based instructions may be translated to text by user experience design generator 102 using speech recognition software, such as Braina Pro, e-Speaking, IBM® Watson Speech to Text, Amazon® Transcribe, etc. The text may then be interpreted by user experience design generator 102 using natural language processing to map the keywords used by developer 104 to commands. Such words may be mapped to commands using a data structure (e.g., table) stored in a storage device (e.g., memory, disk drive) of user experience design generator 102. In one embodiment, such a data structure includes a listing of words mapped to a listing of commands. In one embodiment, such a data structure is stored in a database 105 (discussed further below). Upon identifying a matching command to the word spoken by developer 104, user experience design generator 102 then executes the command. A further description of this and other functions is provided further below.

Furthermore, as shown in FIG. 1, system 100 includes a database 105 connected to user experience design generator 102. In one embodiment, database 105 stores historical user experience designs. In one embodiment, database 105 stores the data structure discussed above that includes a mapping of words to commands.

System 100 is not to be limited in scope to any one particular network architecture. System 100 may include any number of computing devices 101, user experience design generators 102, networks 103, computing devices 104 of developers and databases 105.

A discussion regarding the software components used by user experience design generator 102 to perform the functions of creating user experience designs is discussed below in connection with FIG. 2.

Figure 2:
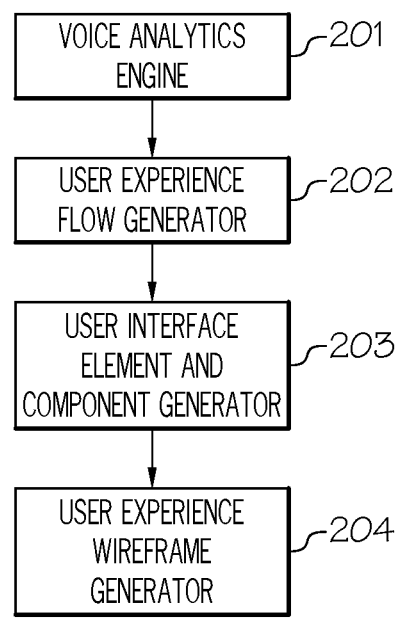
FIG. 2 is a diagram of the software components of the user experience design generator used to create user experience designs in accordance with an embodiment of the present disclosure.

FIG. 2 is a diagram of the software components of user experience design generator 102 (FIG. 1) used to create user experience designs in accordance with an embodiment of the present disclosure.

Referring to FIG. 2, in conjunction with FIG. 1, user experience design generator 102 includes a voice analytics engine 201 configured to determine the feelings, emotions and attitudes expressed by the users of computing devices 101, such as to user experience designs. In one embodiment, voice analytics engine 201 utilizes a tone analyzer to determine characteristics, such as emotion, of user 101 based on the tone of the user's voice, such as in response to questions posed to user 101 regarding a user experience design presented to user 101. Such a tone analyzer is built by first using software to analyze speech by extracting characteristics of the speech waveform that can be used as features to train a machine learning classifier. Given a collection of speech recordings, manually labelled with the emotion expressed, vector representations of each recording are constructed using the extracted features. In one embodiment, feature extraction is accomplished by changing the speech waveform to a form of parametric representation at a relatively minimized data rate for subsequent processing and analysis. Exemplar speech feature extraction techniques include Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP).

Once the features are extracted and the vector representations of speech constructed, a classifier is trained to detect emotions. Examples of classifiers include Support Vector Machines (SVM), Logistic Regressions (Logit), Hidden Markov Models (HMM), and Neural Networks (NN).

In one embodiment, voice analytics engine 201 utilizes natural language processing to map words used by users 101 to characteristics, such as a type of emotion (e.g., angry). For example, speech recognition software may be used to recognize and translate spoken words into text. Examples of such speech recognition software include Braina Pro, e-Speaking, IBM® Watson Speech to Text, Amazon® Transcribe, etc.

Upon recognizing and translating the spoken words into text, the text may be analyzed to detect communication tones categorized as emotion, language and social using IBM® Watson Tone Analyzer. The emotion tones are categorized as anger, disgust, fear, joy and sadness. The language tones are categorized as analytical, confident and tentative. The social tones are categorized as openness, conscientiousness, extraversion, agreeableness and emotional range.

In one embodiment, mood and emotions may be recognized from text using the keyword spotting technique by voice analytics engine 201. In such a technique, text is converted into tokens, and from these tokens, mood and emotion words are identified and detected. Initially, this technique will take some text as input and in the next step tokenization is performed to the input text. Words related to mood and emotions will be identified in the next step. Afterwards, analysis of the intensity of mood and emotion words will be performed. A mood and emotion class may then be found as the required output.

In another embodiment, mood and emotions may be recognized from text using the lexical affinity method. In such a technique, it assigns a probability affinity for a particular mood or emotion to arbitrary words apart from picking up emotional keywords.

In another embodiment, moods and emotions may be recognized from text using learning-based methods. In such a technique, the problem is defined to classify the input texts into different moods and emotions. Unlike keyword-based detection methods, learning-based methods try to detect mood and emotions based on a previously trained classifier, which apply machine learning, such as support vector machines and conditional random fields, to determine which mood and emotion category the input text should belong.

In one embodiment, mood and emotions may be recognized from text using an ontology. For example, an emotion ontology may be utilized which includes a class and subclass relationship format. Mood and emotion classes at the primary level in the hierarchy are at the top of the ontology and mood and emotion classes at the tertiary level are at the bottom of the hierarchy. High weight is assigned to the upper level classes and low weight is assigned to the lower level classes. Mood and emotion of the textual data may then be recognized by calculating weights for a particular mood and emotion by adding weights assigned at each level of the hierarchy as well as calculating the weight for its counter mood and emotion. Both scores are compared and the greater one is taken as the detected mood and emotion.

Furthermore, in one embodiment, voice analytics engine 201 translates speech spoken by developer 104 to text using speech recognition software, such as Braina Pro, e-Speaking, IBM® Watson Speech to Text, Amazon® Transcribe, etc. The text may then be interpreted using natural language processing by voice analytics engine 201 mapping keywords used by developer 104 to commands. Such words may be mapped to commands (e.g., increasing size of user interface element or establishing a border of a particular color around a user interface element) using a data structure (e.g., table) stored in a storage device (e.g., memory, disk drive) of user experience design generator 102. In one embodiment, such a data structure includes a listing of words mapped to a listing of commands. In one embodiment, such a data structure is stored in database 105. Upon identifying a matching command to the word spoken by developer 104, user experience design generator 102 then executes the command, such as a command to add text.

User experience design generator 102 further includes a user experience flow generator 202 configured to generate a user experience flow based on analyzing gathered user requirements in connection with historical user experience designs. A "user experience flow," as used herein, refers to a diagram that displays the complete path a user takes when using a product. The complete path may include steps performed by the user when using a product, such as a computing device to purchase an item sold on a website.

In one embodiment, user experience flow generator 202 gathers user requirements for a defined business goal or problem/opportunity statement. In one embodiment, requirements may be gathered by user experience design generator 102 using interviews and questionnaires. For example, semi-structured or unstructured interviews or questionnaires may include questions targeted for understanding the users' thoughts, preferences, etc. concerning user experience designs. For instance, a user 101 may have a preference for borders around user interface elements being colored in a particular color (e.g., green). Responses to interviews may be performed orally, which may be saved in an audio file (e.g., M4A, MP3®). The audio in the audio file may then be translated into text using speech recognition software, such as Braina Pro, e-Speaking, IBM® Watson Speech to Text, Amazon® Transcribe, etc. Furthermore, responses to questionnaires by users 101 may be performed in writing. Such text (as well as the text converted from speech) may be interpreted by user experience flow generator 202 using natural language processing to determine the thoughts, preferences, etc. expressed by the users of computing devices 101 concerning user experience designs.

In another embodiment, user experience flow generator 202 monitors user interactions (interactions of users 101) thereby inferring user requirements for creating user experience designs by analyzing interaction logs on computing system 101 which provide data about how a task is currently performed. In one embodiment, an event logging tool (e.g., SolarWinds® Security Event Manager, Solar Winds® Log Analyzer, SolarWinds Loggly®, Splunk®, Cloudlytics, Scalyr®, etc.) may be placed on computing system 101 to create the interaction logs for user experience flow generator 202 to analyze. Analyzing such log data may provide information, such as number of clicks and timestamps, the particular steps performed by user 101 to perform a task (e.g., purchase a product), etc. In one embodiment, user requirements may be inferred based on how the user accomplishes a task. For example, if the defined business goal is a sale of a product, and the analyzed interaction log indicates the steps for completing the purchase of the product by user 101, then such steps may be used to infer the user requirements in completing the sale of the product, such as visually displaying the product to be purchased with user ratings prior to the user selecting the purchase button. In one embodiment, user experience flow generator 202 utilizes an analyzing tool, such as SolarWinds® Security Event Manager, Scalyr®, Splunk®, Cloudlytics, etc. to evaluate the interaction sequences. In one embodiment, such sequences may be exported to a spreadsheet to be evaluated by an evaluator to form user requirements.

In one embodiment, user experience flow generator 202 analyzes the gathered user requirements in connection with historical user experience designs. In one embodiment, historical user experience designs are stored in database 105. In one embodiment, historical user experience designs are associated with metadata, that includes a listing of user requirements satisfied by the particular user experience design. In one embodiment, such metadata is created by an evaluator and stored in association with the historical user experience designs, such as in database 105.

In one embodiment, user experience design generator 102 identifies those historical user experience designs with metadata that most closely satisfies the gathered user requirements. In one embodiment, user experience flow generator 202 utilizes natural language processing to identify those historical user experience designs with metadata containing a listing of user requirements that most closely matches in semantic terms with the gathered user requirements. "Matching," as used herein, may be said to occur when the gathered user requirements have a semantic meaning within a threshold degree of similarity with the user requirement(s) listed in the metadata of the historical user experience designs. In one embodiment, such a threshold may be user-specified. In one embodiment, those historical user experience designs with a greater number of matching user requirements may be selected to be used to derive user experience flows over those with a fewer number of matching user requirements. In one embodiment, only those historical user experience designs with a threshold number (may be user-specified) of matching user requirements may be utilized for deriving user experience flows. In one embodiment, a limited number (may be user-specified) of historical user experience designs are selected to derive user experience flows as discussed below.

In one embodiment, user experience flow generator 202 generates a user experience flow by utilizing the user experience flow from the closest matching historical user experience design or modifying such a user experience flow from one of the closest matching historical user experience designs to meet the thoughts, preferences, etc. in terms of the user requirements of user 101. Based on analyzing the gathered data, such thoughts, preferences, etc. in terms of user requirements may be used to determine what components need to be presented in the user experience flow, what order they should appear in, how many screens are needed, etc. For example, a historical user experience flow of one of the closest matching historical user experience designs may include the step of browsing the screen with all videos available; whereas, user 101 has expressed the preference of only displaying a single video. Consequently, the user experience flow from such a historical user experience design would be modified from having the step of browsing the screen with all videos available to simply browsing the screen with a single video available. In one embodiment, each of the historical user experience flows stored in database 105 may contain multiple options (e.g., different options for browsing the screen, different options for concluding a sale), where the option that is selected is most similar to the thoughts, preferences, etc. of the user requirements expressed by user 101. In one embodiment, user experience flow generator 202 utilizes natural language processing for determining which option is closest to the user's desires, such as matching a meaning of a word used by user 101 in connection with user 101 expressing his/her requirements (i.e., the thoughts, preferences, etc. of the user in terms of user requirements) to one of the optional choices.

In one embodiment, user experience flow generator 202 utilizes natural language processing to map words used by users 101 to characteristics, such as preferences expressed by the users of computing devices 101. For instance, words may be mapped to characteristics, such as thoughts, preferences, etc. using a data structure stored in a storage device (e.g., memory, disk drive) of user experience design generator 102 or in database 105. In one embodiment, the data structure includes a listing of words mapped to a listing of thoughts and preferences. Upon identifying a matching characteristic to the word spoken by user 101, user experience flow generator 202 stores such user thoughts and preferences in a profile of the user, which will later be used to derive a user experience flow. For example, the profile of the user may indicate what components need to be presented in the user experience flow, what order they should appear in, how many screens are needed, etc. For instance, a historical user experience flow of one of the closest matching historical user experience designs may include the step of providing the option of purchasing the product using PayPal®; whereas, user 101 has expressed the preference of not purchasing products using PayPal®. Consequently, the user experience flow from such a historical user experience design would be modified from having the step of providing the option of purchasing the product using PayPal® to no longer providing such an option. In one embodiment, such user profiles are stored in database 105.

Referring again to FIG. 2, in conjunction with FIG. 1, user experience design generator 102 further includes a user interface element and component generator 203 configured to generate user interface elements and components. In one embodiment, user interface element and component generator 203 generates such elements and components based on the user experience flows derived by user experience flow generator 202 and the theme selected by user 101. A "theme," as used herein, refers to the idea in or pervades the user experience design. For example, user 101 may select the theme of "flowers" in which user interface elements and components may include different flowers. In another example, user 101 may select the theme of "fruits" in which user interface elements and components may include different fruits. In a further example, user 101 may select the theme of "Spider-Man" in which user interface elements and components may include web shooters.

In one embodiment, each theme may be associated with a data structure (e.g., table) storing user interface elements and components for that theme. For example, the data structure (e.g., table) may store a listing of user interface elements and components of different fruits for the theme of "fruits." In one embodiment, such a data structure is stored in a storage device (e.g., memory, disk drive) of user experience design generator 102. In another embodiment, such a data structure is stored in database 105.

In one embodiment, the user interface elements and components generated by user interface element and component generator 203 correspond to those elements and components needed to implement the user experience flow derived by user experience flow generator 202. For example, if there is a step in the user experience flow of the user purchasing a product, then a user interface element corresponding to "purchasing" may be generated.

In one embodiment, user interference element and component generator 203 generates the user interface elements based on the steps in the user experience flow by matching such steps to user interface elements and components listed in a data structure, such as a table. In one embodiment, a data structure, such as a table, includes a listing of user interface elements and components corresponding to steps in user experience flows. In one embodiment, such a data structure is stored in a storage device (e.g., memory, disk drive) of user experience design generator 102. In another embodiment, such a data structure is stored in database 105.

In one embodiment, user interface element and component generator 203 generates user interface elements and components to enact the tasks or actions as well as what is displayed on the display of the user's computing device as shown in the user experience flow. In one embodiment, user interface element and component generator 203 utilizes natural language processing to match such tasks or actions, including understanding what is displayed to the user on the user's display of the user's computing device, to stored user interface elements or components. In one embodiment, the user interface elements and components are stored in a database 105 and associated with metadata that describes the features associated with such user interface elements and components. For example, the user interface element of a button to purchase an item may be associated with the metadata of "purchase." In another example, the user interface element of a text field may be associated with the metadata of a field to allow a user to enter text, such as text to perform a keyword search. Other examples of user interface elements and components include checkboxes, radio buttons, dropdown lists, list boxes, dropdown buttons, toggles, date and time pickers, etc.

In one embodiment, user interface element and component generator 203 is configured to create classifications and mappings of user interface elements and components with the user-selected theme. "Classifications," as used herein, refer to categories, such as categories associated with particular themes. "Mappings," as used herein, refer to connecting or associating, such as mapping user interface elements and components with other user interface elements and components with the same or similar classification. For instance, user interface elements and components with the classification of the theme of "fruit" may all be mapped to one another. In one embodiment, such classifications and mappings are created by user interface element and component generator 203 using metadata associated with the user interface elements and components. Such metadata may include one or more themes. In one embodiment, metadata associated with user interface elements and components of prior historical user experience designs are stored in database 105, where such metadata was previously established by a developer. In one embodiment, user interface element and component generator 203 utilizes natural language processing to match the user-provided theme with the metadata (includes one or more themes) associated with stored user interface elements and components. Those that have a semantic meaning within a threshold degree of similarity are deemed to be matching, and such user interface elements and components associated with such metadata are mapped to one another and classified in the same category. In one embodiment, such a semantic meaning is determined using natural language processing.

Referring again to FIG. 2, in conjunction with FIG. 1, user experience design generator 102 includes a user experience wireframe generator 204 configured to generate wireframes. In one embodiment, user experience wireframe generator 204 transforms paper sketches received from the users of computing devices 101 into wireframes. A "wireframe," as used herein, is a diagram or a set of diagrams that consists of simple lines and shapes, such as representing a sketch provided by a user of computing device 101. For example, such a sketch could be an outline of a webpage or application. In one embodiment, wireframes provide a clear overview of the page structure, layout, information architecture, functionality and intended behaviors. In one embodiment, the wireframe represents the initial product concept. In one embodiment, wireframes are used to indicate where information will be placed before the developers build the interface out with code.

In one embodiment, user experience wireframe generator 204 generates a wireframe from a paper sketch provided by a user of computing device 101, such as a scanned sketch, using Uizard, Sketch by Sketch B.V., Concepts, Justinmind® Web Wireframe UI kit, etc.

In one embodiment, such wireframes can be updated by developer 104, such as via audio-based instructions. As previously discussed, such audio-based instructions may be translated by voice analytics engine 201 of user experience design generator 102 to text using speech recognition software, such as Braina Pro, e-Speaking, IBM® Watson Speech to Text, Amazon® Transcribe, etc. The text may then be interpreted by voice analytics engine 201 using natural language processing to map the keywords used by developer 104 to commands. Such words may be mapped to commands using a data structure (e.g., table) stored in a storage device (e.g., memory, disk drive) of user experience design generator 102 or in a database 105. In one embodiment, such a data structure includes a listing of words mapped to a listing of commands. Upon identifying a matching command to the word spoken by developer 104, user experience design generator 102 then executes the command, such as modifying a length of the left-most stroke of the wireframe.

A further description of these and other functions is provided below in connection with the discussion of the method for creating user experience designs using derived user experience flows and derived user interface elements and components.

Prior to the discussion of the method for creating user experience designs using derived user experience flows and derived user interface elements and components, a description of the hardware configuration of user experience design generator 102 (FIG. 1) is provided below in connection with FIG. 3.

Figure 3:
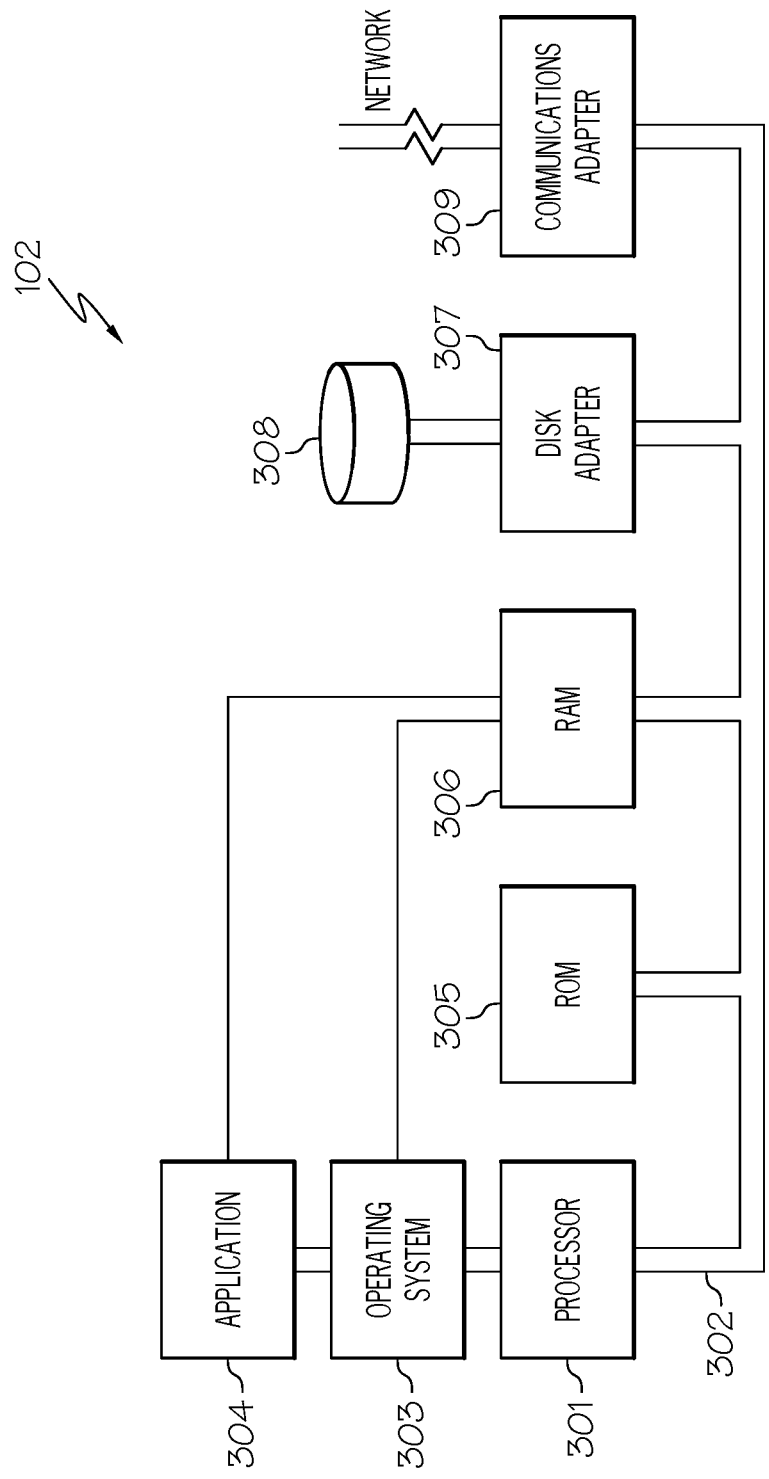
FIG. 3 illustrates an embodiment of the present disclosure of the hardware configuration of the user experience design generator which is representative of a hardware environment for practicing the present disclosure.

Referring now to FIG. 3, FIG. 3 illustrates an embodiment of the present disclosure of the hardware configuration of user experience design generator 102 (FIG. 1) which is representative of a hardware environment for practicing the present disclosure.

User experience design generator 102 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, voice analytics engine 201 (FIG. 2), user experience flow generator 202 (FIG. 2), user interface element and component generator 203 (FIG. 2) and user experience wireframe generator 204 (FIG. 2). Furthermore, application 304 may include, for example, a program for creating user experience designs using derived user experience flows and derived user interface elements and components as discussed further below in connection with FIGS. 4A-4B and 5-7.

Referring again to FIG. 3, read-only memory ("ROM") 305 is connected to system bus 302 and includes a basic input/output system ("BIOS") that controls certain basic functions of user experience design generator 102. Random access memory ("RAM") 306 and disk adapter 307 are also connected to system bus 302. It should be noted that software components including operating system 303 and application 304 may be loaded into RAM 306, which may be user experience design generator's 102 main memory for execution. Disk adapter 307 may be an integrated drive electronics ("IDE") adapter that communicates with a disk unit 308, e.g., disk drive. It is noted that the program for creating user experience designs using derived user experience flows and derived user interface elements and components, as discussed further below in connection with FIGS. 4A-4B and 5-7, may reside in disk unit 308 or in application 304.

User experience design generator 102 may further include a communications adapter 309 connected to bus 302. Communications adapter 309 interconnects bus 302 with an outside network (e.g., network 103 of FIG. 1) to communicate with other devices, such as computing devices 101, 104, etc.

In one embodiment, application 304 of user experience design generator 102 includes the software components of voice analytics engine 201, user experience flow generator 202, user interface element and component generator 203 and user experience wireframe generator 204. In one embodiment, such components may be implemented in hardware, where such hardware components would be connected to bus 302. The functions discussed above performed by such components are not generic computer functions. As a result, user experience design generator 102 is a particular machine that is the result of implementing specific, non-generic computer functions.

In one embodiment, the functionality of such software components (e.g., voice analytics engine 201, user experience flow generator 202, user interface element and component generator 203 and user experience wireframe generator 204) of user experience design generator 102, including the functionality for creating user experience designs, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, user experience (UX) design is the process of supporting user behavior through usability, usefulness, and desirability provided in the interaction with a product. User experience design encompasses traditional human-computer interaction (HCI) design and extends it by addressing all aspects of a product or service as perceived by users. In other words, UX design is the process of designing (digital or physical) products that are useful, easy to use, and delightful to interact with. Such UX designs are used by design teams to create products that provide meaningful and relevant experiences to users. Currently though such UX design processes have difficulty in gathering information to determine users' requirements in creating the UX design. Furthermore, such UX design processes fail to create the UX design taking into consideration the user's emotions and thought processes. Additionally, such UX design processes fail to discover user interface elements which align with such users' requirements and thought processes. As a result, the currently created UX designs cannot effectively be used to create products that provide meaningful and relevant experiences to users.

Figure 4A:
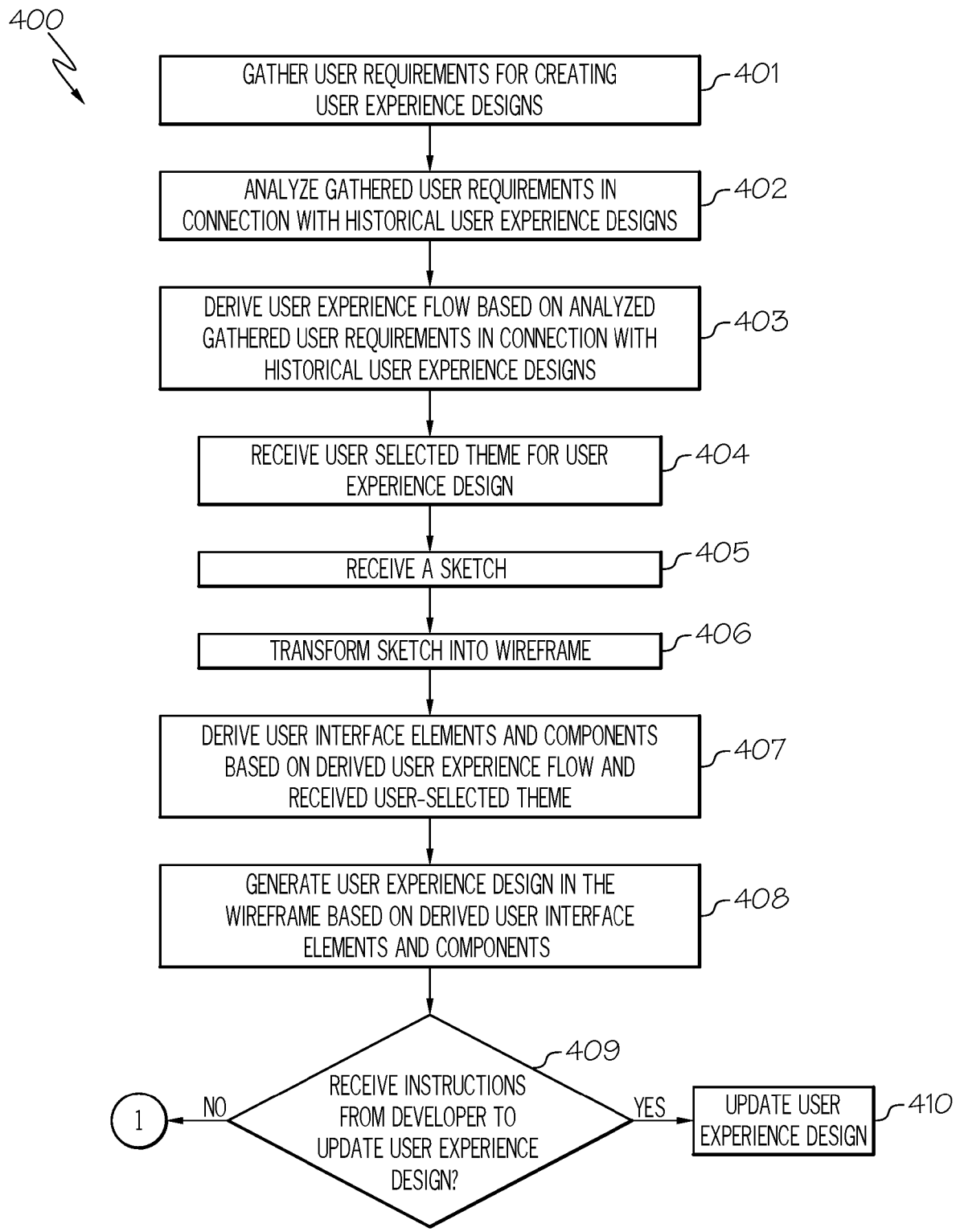
FIGS. 4A-4B are a flowchart of a method for creating user experience designs in accordance with an embodiment of the present disclosure.
Figure 4B:
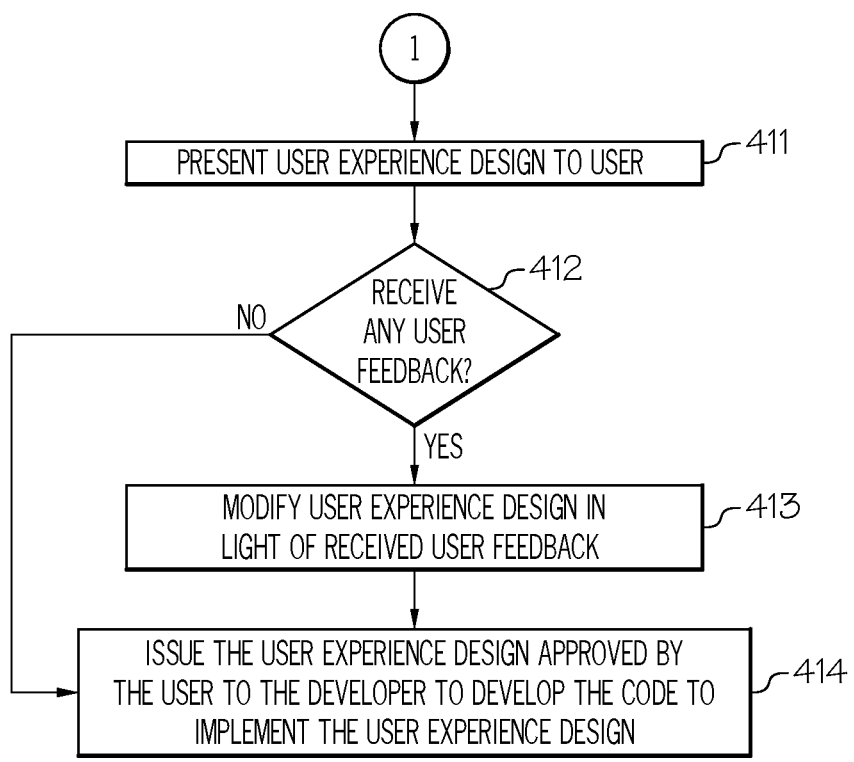
Figure 5:
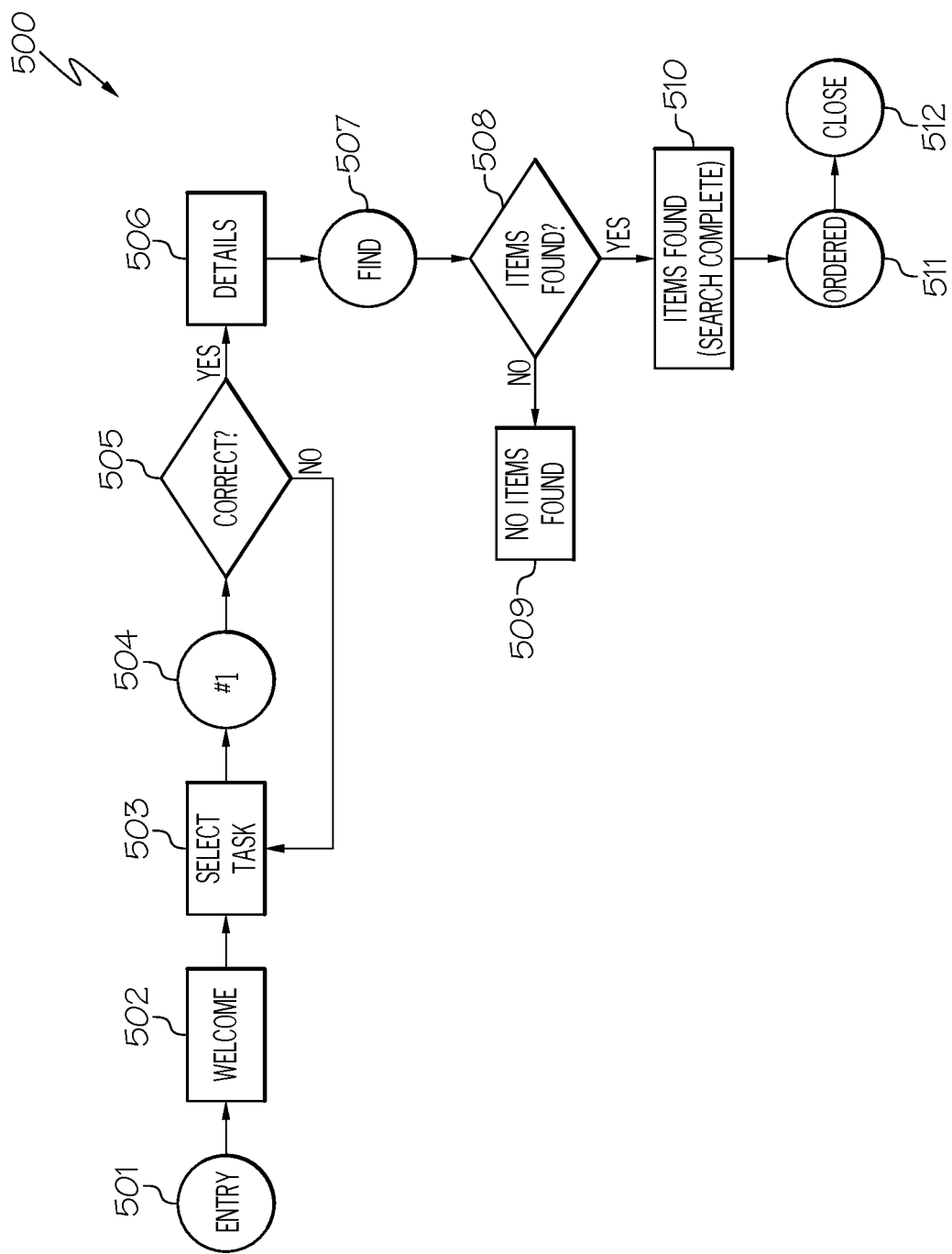
FIG. 5 illustrates a user experience flow in accordance with an embodiment of the present disclosure.
Figure 6:
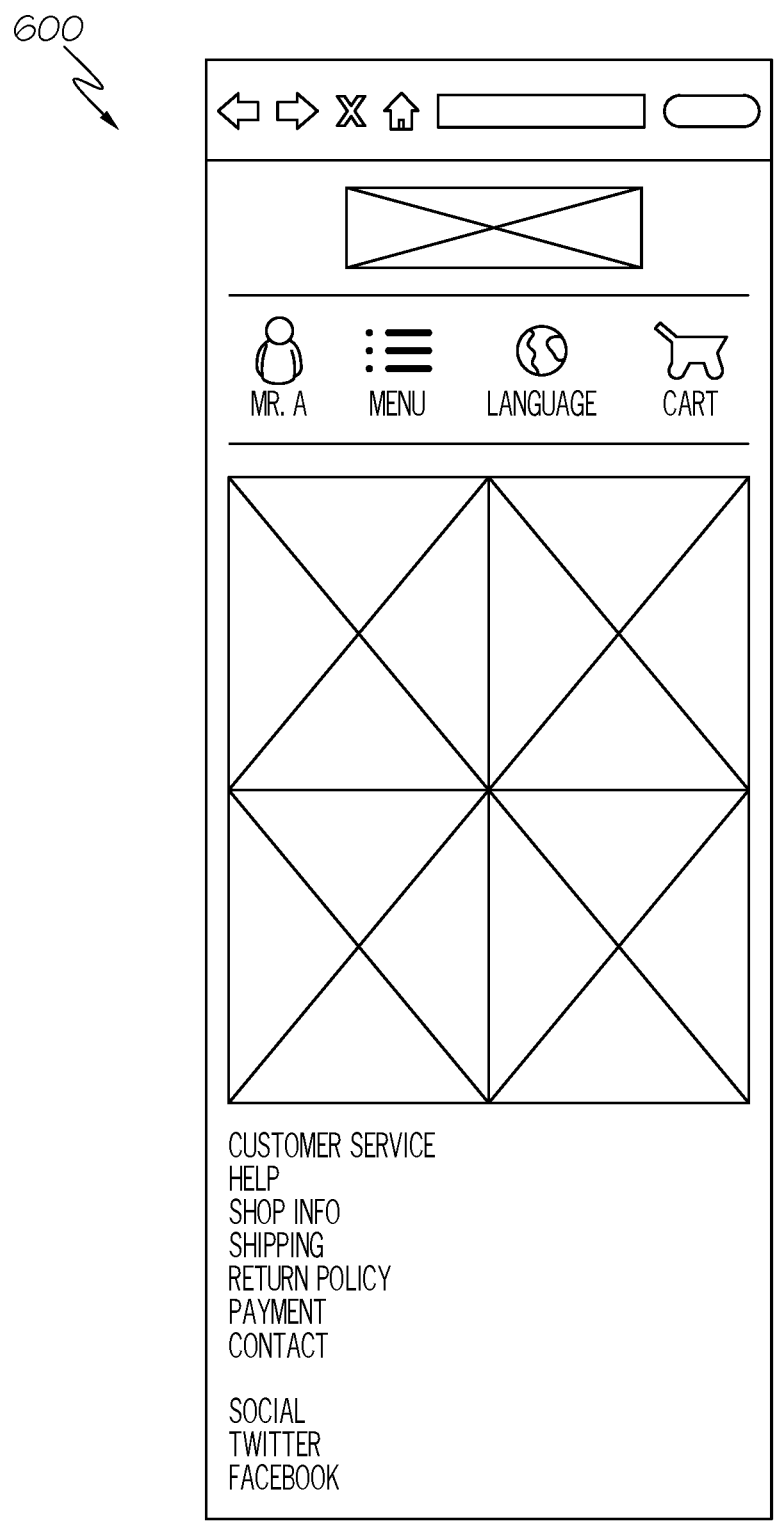
FIG. 6 illustrates an exemplary wireframe of a website in accordance with an embodiment of the present disclosure.
Figure 7:
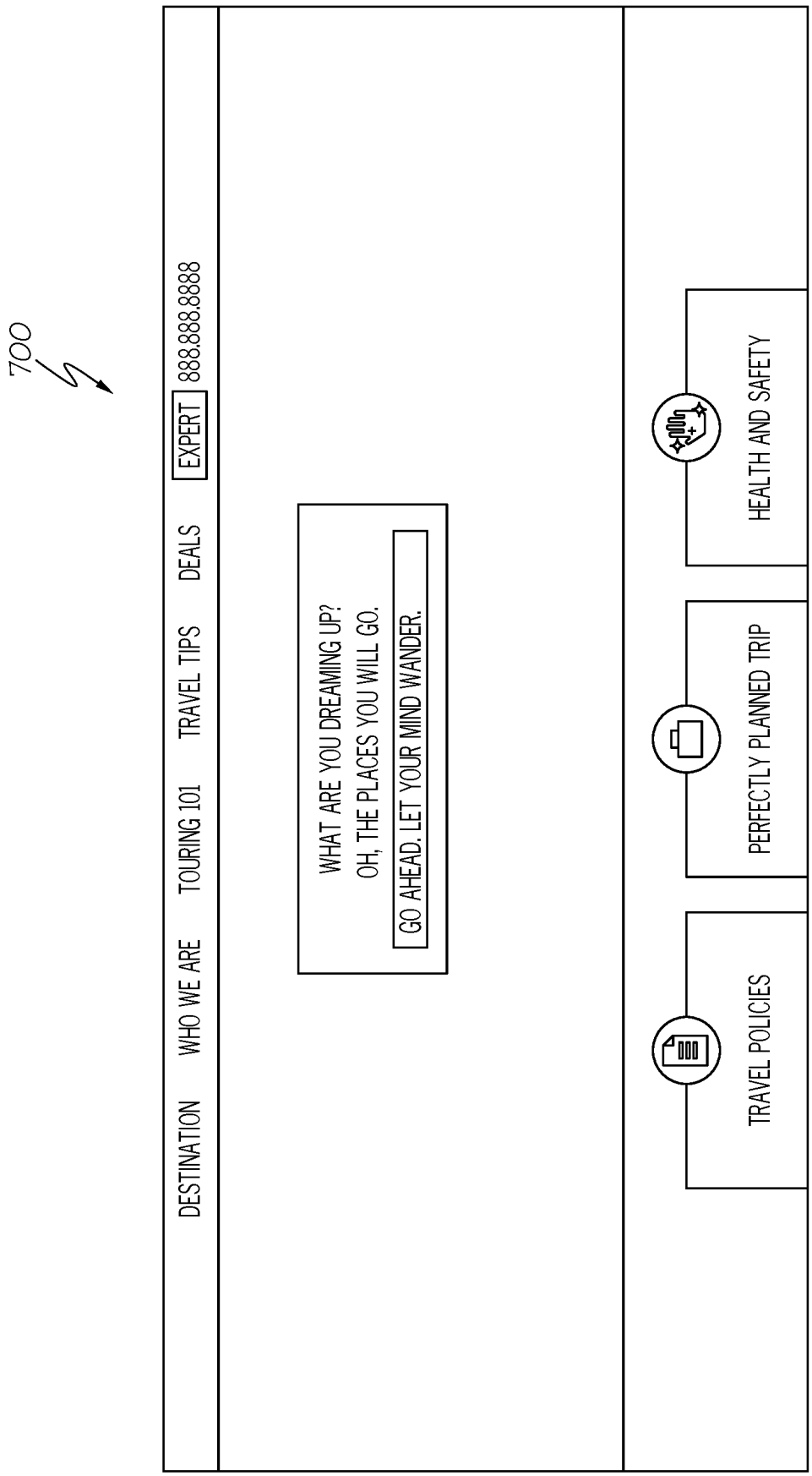
FIG. 7 illustrates a user experience design in a wireframe based on the derived user interface elements and components in accordance with an embodiment of the present disclosure.

The embodiments of the present disclosure provide a means for creating user experience designs that can be used to create products that provide meaningful and relevant experiences to users by deriving user experience flows from gathered requirements of the user experience design and deriving user interface elements and components based on the derived user experience flows and theme selected by the user as discussed below in connection with FIGS. 4A-4B and 5-7. FIGS. 4A-4B are a flowchart of a method for creating user experience designs. FIG. 5 illustrates a user experience flow. FIG. 6 illustrates an exemplary wireframe of a website. FIG. 7 illustrates a user experience design in a wireframe based on the derived user interface elements and components.

As discussed above, FIGS. 4A-4B are a flowchart of a method 400 for creating user experience designs in accordance with an embodiment of the present disclosure.

Referring to FIG. 4A, in conjunction with FIGS. 1-3, in step 401, user experience flow generator 202 of user experience design generator 102 gathers user requirements for creating user experience designs. In one embodiment, such user requirements pertain to a defined business goal or problem/opportunity statement provided by a user, such as the user of computing device 101.

As previously discussed, there are many ways that user experience design generator 102 may gather user requirements.

In one embodiment, requirements may be gathered by user experience flow generator 202 using interviews and questionnaires. For example, semi-structured or unstructured interviews or questionnaires may include questions targeted for understanding the users' thoughts, preferences, etc. concerning user experience designs. For instance, a user 101 may have a preference for borders around user interface elements being colored in a particular color (e.g., green). Responses to interviews may be performed orally, which may be saved in an audio file (e.g., M4A, MP3®). The audio in the audio file may then be translated into text using speech recognition software, such as Braina Pro, e-Speaking, IBM® Watson Speech to Text, Amazon® Transcribe, etc. Furthermore, responses to questionnaires by users 101 may be performed in writing. Such text (as well as the text converted from speech) may be interpreted by user experience flow generator 202 using natural language processing to determine the thoughts, preferences, etc. expressed by the users of computing devices 101 concerning user experience designs.

In another embodiment, user experience flow generator 202 monitors user interactions (interactions of users 101) thereby inferring user requirements for creating user experience designs by analyzing interaction logs on computing system 101 which provide data about how a task is currently performed. In one embodiment, an event logging tool (e.g., SolarWinds® Security Event Manager, Solar Winds® Log Analyzer, SolarWinds Loggly®, Splunk®, Cloudlytics, Scalyr®, etc.) may be placed on computing system 101 to create the interaction logs for user experience flow generator 202 to analyze. Analyzing such log data may provide information, such as number of clicks and timestamps, the particular steps performed by user 101 to perform a task (e.g., purchase a product), etc. In one embodiment, user requirements may be inferred based on how the user accomplishes a task. For example, if the defined business goal is a sale of a product, and the analyzed interaction log indicates the steps for completing the purchase of the product by user 101, then such steps may be used to infer the user requirements in completing the sale of the product, such as visually displaying the product to be purchased with user ratings prior to the user selecting the purchase button. In one embodiment, user experience flow generator 202 utilizes an analyzing tool, such as SolarWinds® Security Event Manager, Scalyr®, Splunk®, Cloudlytics, etc. to evaluate the interaction sequences. In one embodiment, such sequences may be exported to a spreadsheet to be evaluated by an evaluator to form user requirements.

In step 402, user experience flow generator 202 of user experience design generator 102 analyzes the gathered user requirements in connection with historical user experience designs. In one embodiment, historical user experience designs are stored in database 105. As previously discussed, in one embodiment, historical user experience designs are associated with metadata, that includes a listing of user requirements satisfied by the particular user experience design. In one embodiment, such metadata is created by an evaluator and stored in association with the historical user experience designs, such as in database 105.

In one embodiment, user experience design generator 102 identifies those historical user experience designs with metadata that most closely satisfies the gathered user requirements. In one embodiment, user experience flow generator 202 utilizes natural language processing to identify those historical user experience designs with metadata containing a listing of user requirements that most closely matches in semantic terms with the gathered user requirements. "Matching," as used herein, may be said to occur when the gathered user requirements have a semantic meaning within a threshold degree of similarity with the user requirement(s) listed in the metadata of the historical user experience designs. In one embodiment, such a threshold may be user-specified. In one embodiment, those historical user experience designs with a greater number of matching user requirements may be selected to be used to derive user experience flows over those with a fewer number of matching user requirements. In one embodiment, only those historical user experience designs with a threshold number (may be user-specified) of matching user requirements may be utilized for deriving user experience flows. In one embodiment, a limited number (may be user-specified) of historical user experience designs are selected to derive user experience flows as discussed below.

In step 403, user experience flow generator 202 of user experience design generator 102 derives a user experience flow based on the analyzed gathered user requirements in connection with historical user experience designs. A "user experience flow," as used herein, refers to a diagram that displays the complete path a user takes when using a product. The complete path may include steps performed by the user when using a product, such as a computing device to purchase an item sold on a website.

As discussed above, in one embodiment, user experience flow generator 202 generates a user experience flow by utilizing the user experience flow from the closest matching historical user experience design or modifying such a user experience flow from one of the closest matching historical user experience designs to meet the thoughts, preferences, etc. in terms of the user requirements of user 101. Based on analyzing the gathered data, such thoughts, preferences, etc. in terms of user requirements may be used to determine what components need to be presented in the user experience flow, what order they should appear in, how many screens are needed, etc. For example, a historical user experience flow of one of the closest matching historical user experience designs may include the step of browsing the screen with all videos available; whereas, user 101 has expressed the preference of only displaying a single video. Consequently, the user experience flow from such a historical user experience design would be modified from having the step of browsing the screen with all videos available to simply browsing the screen with a single video available. In one embodiment, each of the historical user experience flows stored in database 105 may contain multiple options (e.g., different options for browsing the screen, different options for concluding a sale), where the option that is selected is most similar to the thoughts, preferences, etc. of the user requirements expressed by user 101. In one embodiment, user experience flow generator 202 utilizes natural language processing for determining which option is closest to the user's desires, such as matching a meaning of a word used by user 101 in connection with user 101 expressing his/her requirements (i.e., the thoughts, preferences, etc. of the user in terms of user requirements) to one of the optional choices.

In one embodiment, user experience flow generator 202 utilizes natural language processing to map words used by users 101 to characteristics, such as preferences expressed by the users of computing devices 101. For instance, words may be mapped to characteristics, such as thoughts, preferences, etc. using a data structure stored in a storage device (e.g., memory, disk drive) of user experience design generator 102 or in database 105. In one embodiment, the data structure includes a listing of words mapped to a listing of thoughts and preferences. Upon identifying a matching characteristic to the word spoken by user 101, user experience flow generator 202 stores such user thoughts and preferences in a profile of the user, which will later be used to derive a user experience flow. For example, the profile of the user may indicate what components need to be presented in the user experience flow, what order they should appear in, how many screens are needed, etc. For instance, a historical user experience flow of one of the closest matching historical user experience designs may include the step of providing the option of purchasing the product using PayPal®; whereas, user 101 has expressed the preference of not purchasing products using PayPal®. Consequently, the user experience flow from such a historical user experience design would be modified from having the step of providing the option of purchasing the product using PayPal® to no longer providing such an option. In one embodiment, such user profiles are stored in database 105.

An illustration of a derived user experience flow is provided in FIG. 5. Referring to FIG. 5, FIG. 5 illustrates a user experience flow 500 in accordance with an embodiment of the present disclosure.

Referring to FIG. 5, user experience flow 500 displays a complete path a user takes when using a product. In particular, user experience flow 500 illustrates the steps performed by the user when using a product, such as a computing device to purchase an item sold on a website.

As shown in FIG. 5, each touchpoint on the user's journey is represented by a node in the flowchart. These nodes are characterized by shape, and each shape indicates a particular process. For instance, a diamond means a decision is being made and is therefore followed by "Yes" and "No" arrows. A rectangle indicates what is displayed to the user on the user's display of the user's computing device. A circle indicates a task or action that needs to be taken, such as "Log in" or "Purchase."

For example, as shown in FIG. 5, user experience flow 500 includes an entry 501 or starting of the user session followed by a welcome 502 page being displayed to the user on the user's display of the user's computing device 101. Next, a task 503 to be selected by the user, such as a product search, is displayed on the user's display of the user's computing device 101. Such action is represented by element 504. A decision 505 is then made as to whether the action is correct. If the action is not correct, then a task 503 to be selected by the user, such as a feature search, is displayed on the user's display of the user's computing device 101. If, however, the action is correct, then details 506 are displayed on the user's display of the user's computing device 101, such as an indication that a product search will be performed. An action of find 507, such as a product search, is executed. A decision 508 as to whether any items were found is made. If no items were found, then an indication that no items were found 509 is displayed on the user's display of the user's computing device 101. If, however, items were found (i.e., the search is complete), then an indication that items were found 510 is displayed on the user's display of the user's computing device 101. The next steps in user experience flow 500 include the action of ordering 511 ("ordered") a product followed by the action of closing 512 ("close") the user session.

Referring to FIG. 4A, in conjunction with FIGS. 1-3 and 5, in step 404, user interface element and component generator 203 receives a theme for the user experience design selected by a user (user of computing device 101). In one embodiment, various theme options may be presented to the user of computing device 101 by displaying such options on the display of computing device 101. A "theme," as used herein, refers to the idea in or pervades the user experience design. For example, user 101 may select the theme of "flowers" in which user interface elements and components may include different flowers. In another example, user 101 may select the theme of "fruits" in which user interface elements and components may include different fruits. In a further example, user 101 may select the theme of "Spider-Man" in which user interface elements and components may include web shooters.

In one embodiment, each theme may be associated with a data structure (e.g., table) storing user interface elements and components for that theme. For example, the data structure (e.g., table) may store a listing of user interface elements and components of different fruits for the theme of "fruits." In one embodiment, such a data structure is stored in a storage device (e.g., memory, disk drive) of user experience design generator 102. In another embodiment, such a data structure is stored in database 105.

In step 405, experience design generator 102 receives a sketch, such as a sketch of a user interface, from a user of computing device 101. For example, such a sketch could be an outline of a webpage or application. In one embodiment, the user of computing device 101 may input a sketch in computing device 101, such as scanning a paper sketch into an electronic file, which is transmitted to user experience design generator 102.

In step 406, user experience wireframe generator 204 of user experience design generator 102 transforms the received sketch into a wireframe. A "wireframe," as used herein, is a diagram or a set of diagrams that consists of simple lines and shapes, such as representing a sketch provided by a user of computing device 101. For example, such a sketch could be an outline of a webpage or application, such as shown in FIG. 6. FIG. 6 illustrates an exemplary wireframe 600 of a website in accordance with an embodiment of the present disclosure.

As previously discussed, in one embodiment, wireframes provide a clear overview of the page structure, layout, information architecture, functionality and intended behaviors. In one embodiment, the wireframe represents the initial product concept. In one embodiment, wireframes are used to indicate where information will be placed before the developers build the interface out with code.

In one embodiment, user experience wireframe generator 204 generates a wireframe from a paper sketch provided by a user of computing device 101, such as a scanned sketch, using Uizard, Sketch by Sketch B.V., Concepts, Justinmind® Web Wireframe UI kit, etc.

In one embodiment, such wireframes can be updated by developer 104, such as via audio-based instructions. As previously discussed, such audio-based instructions may be translated by voice analytics engine 201 of user experience design generator 102 to text using speech recognition software, such as Braina Pro, e-Speaking, IBM® Watson Speech to Text, Amazon® Transcribe, etc. The text may then be interpreted by voice analytics engine 201 using natural language processing to map the keywords used by developer 104 to commands. Such words may be mapped to commands using a data structure (e.g., table) stored in a storage device (e.g., memory, disk drive) of user experience design generator 102 or in a database 105. In one embodiment, such a data structure includes a listing of words mapped to a listing of commands. Upon identifying a matching command to the word spoken by developer 104, user experience design generator 102 then executes the command, such as modifying a length of the left-most stroke of the wireframe.

In step 407, user interface element and component generator 203 of user experience design generator 102 derives user interface elements and components based on the derived user experience flow and the received user-selected theme.

As discussed above, in one embodiment, the user interface elements and components generated by user interface element and component generator 203 correspond to those elements and components needed to implement the user experience flow derived by user experience flow generator

202. For example, if there is a step in the user experience flow of the user purchasing a product, then a user interface element corresponding to "purchasing" may be generated.

In one embodiment, user interference element and component generator 203 generates the user interface elements based on the steps in the user experience flow by matching such steps to user interface elements and components listed in a data structure, such as a table. In one embodiment, a data structure, such as a table, includes a listing of user interface elements and components corresponding to steps in user experience flows. In one embodiment, such a data structure is stored in a storage device (e.g., memory, disk drive) of user experience design generator 102. In another embodiment, such a data structure is stored in database 105.

In one embodiment, user interface element and component generator 203 generates user interface elements and components to enact the tasks or actions as well as what is displayed on the display of the user's computing device as shown in the user experience flow. In one embodiment, user interface element and component generator 203 utilizes natural language processing to match such tasks or actions, including understanding what is displayed to the user on the user's display of the user's computing device, to stored user interface elements or components. In one embodiment, the user interface elements and components are stored in a database 105 and associated with metadata that describes the features associated with such user interface elements and components. For example, the user interface element of a button to purchase an item may be associated with the metadata of "purchase." In another example, the user interface element of a text field may be associated with the metadata of a field to allow a user to enter text, such as text to perform a keyword search. Other examples of user interface elements and components include checkboxes, radio buttons, dropdown lists, list boxes, dropdown buttons, toggles, date and time pickers, etc.

In one embodiment, user interface element and component generator 203 is configured to create classifications and mappings of user interface elements and components with the user-selected theme. "Classifications," as used herein, refer to categories, such as categories associated with particular themes. "Mappings," as used herein, refer to connecting or associating, such as mapping user interface elements and components with other user interface elements and components with the same or similar classification. For instance, user interface elements and components with the classification of the theme of "fruit" may all be mapped to one another. In one embodiment, such classifications and mappings are created by user interface element and component generator 203 using metadata associated with the user interface elements and components. Such metadata may include one or more themes. In one embodiment, metadata associated with user interface elements and components of prior historical user experience designs are stored in database 105, where such metadata was previously established by a developer. In one embodiment, user interface element and component generator 203 utilizes natural language processing to match the user-provided theme with the metadata (includes one or more themes) associated with stored user interface elements and components. Those that have a semantic meaning within a threshold degree of similarity are deemed to be matching, and such user interface elements and components associated with such metadata are mapped to one another and classified in the same category. In one embodiment, such a semantic meaning is determined using natural language processing.

In step 408, user experience design generator 102 generates the user experience design, such as in the wireframe of step 406, based on the derived user interface elements and components. In this manner, the embodiments of the present disclosure provide a means for creating user experience designs that can be used to create products that provide meaningful and relevant experiences to users.

In one embodiment, the user experience design is generated to incorporate the derived user interface elements and components (e.g., icons representing categories) for those that are mapped and classified to the theme selected by the user (see step 404). For example, if the user selected the theme of travel in step 404, then the derived user interface elements and components that are mapped and classified to the theme selected by the user will be generated in the wireframe of 406 as illustrated in FIG. 7.

FIG. 7 illustrates a user experience design 700 in a wireframe based on the derived user interface elements and components in accordance with an embodiment of the present disclosure. As shown in FIG. 7, user experience design generator 102 generates the user experience design 700 with the theme of travel using the derived user interface elements and components that are mapped and classified to the theme of travel selected by the user.

Referring to FIG. 4A, in conjunction with FIGS. 1-3 and 5-7, in one embodiment, the derived user interface elements and components of step 407 are incorporated in the wireframe generated in step 406. In one embodiment, user experience design generator 102 incorporates such derived user interface elements and components based on the types of user interface elements and components (e.g., input elements, output elements and helper elements), where such classifications may be found in the metadata associated with such user interface elements and components. In one embodiment, as an initial draft, user experience design generator 102 places the user interface elements and components that are input elements on top followed by placing those user interface elements and components that are classified as helper elements in the center and placing those user interface elements and components that are classified as output elements on the bottom of the wireframe.

In one embodiment, the paper sketch (discussed in step 405) includes an identification of the type of user interface elements and components to be placed in certain positions of the sketch. Upon transforming the paper sketch into a wireframe, user experience wireframe generator 204 utilizes natural language processing to determine the user-designated type of user interface element and component to be placed in user-designated positions. Such an identified type of a user interface element and component may be mapped to a type of user interface element and component found in a listing of types of user interface elements and components that is stored in a data structure (e.g., table) stored in a storage device (e.g., memory, disk drive) of user experience design generator 102 or in repository 105. The particular type of user interface element and component to be included in the wireframe is identified by identifying the type of user interface element and component that is listed in this data structure that is most semantically similar to the user-designated identification within a threshold degree of semantic meaning. Such identified types from this data structure are then associated with positions in the wireframe that correspond to the positions identified by the user where such types of user interface elements and components are to be placed. In one embodiment, such positions in the wireframe are marked, such as via numbers, which may or may not be visible to the human eye. In one embodiment, such positions, and the associated types of user interface elements and components, are stored in metadata associated with the wireframe, which are stored in a storage device (e.g., memory, disk drive) of user experience design generator 102 or in repository 105.

After generating a draft of the user experience design, which may be presented to the developer on the display of computing device 104, in step 409, a determination is made by user experience design generator 102 as to whether it received instructions from developer 104 to update the user experience design.

In one embodiment, the developer, such as the developer of computing device 104 may update the user experience design using various software tools, such as Terrastruct, Cacoo, Sketch by Sketch B.V., Omnigraffle®, Axure®, etc.

Furthermore, in one embodiment, as discussed above, developer 104 provides audio-based instructions to user experience design generator 102 to update the draft of the user experience design, such as "add text area element next to element classified as Spider-Man." Such audio-based instructions may be translated by user experience design generator 102 to text using speech recognition software, such as Braina Pro, e-Speaking, IBM® Watson Speech to Text, Amazon® Transcribe, etc. The text may then be interpreted by user experience design generator 102 using natural language processing to map the keywords used by developer 104 to commands. Such words may be mapped to commands using a data structure (e.g., table) stored in a storage device (e.g., memory, disk drive) of user experience design generator 102 or in repository 105. In one embodiment, such a data structure includes a listing of words mapped to a listing of commands. Upon identifying a matching command to the word spoken by developer 104, user experience design generator 102 then executes the command.

If the user experience design is to be updated by developer 104, then, in step 410, user experience design generator 102 updates the user experience design in response to instructions received from developer 104 to update the user experience design. Afterwards, user experience design generator 102 continues to determine whether it received further instructions from developer 104 to further update the user experience design in step 409.

Referring to FIG. 4B, in conjunction with FIGS. 1-3 and 5-7, if, however, there are no updates to the user experience design or further updates to the user experience design from developer 104, which may be indicated by the developer (developer of computing device 104) indicating that the user experience design is complete (e.g., selecting a "complete" or "finish" option), then in step 411, user experience design generator 102 presents the completed user experience design to the user (e.g., user of computing device 101).

In step 412, user experience design generator 102 determines whether it received any user feedback to update the user experience design.

Such feedback may be received in a similar manner as receiving feedback from developer 104. For example, the user, such as the user of computing device 101, may update the user experience design using various software tools, such as Terrastruct, Cacoo, Sketch by Sketch B.V., Omnigraffle®, Axure®, etc.

Furthermore, in one embodiment, as discussed above, user 101 provides audio-based instructions to user experience design generator 102 to update the draft of the user experience design, such as "add text area element next to element classified as the send button." Such audio-based instructions may be translated by user experience design generator 102 to text using speech recognition software, such as Braina Pro, e-Speaking, IBM® Watson Speech to Text, Amazon® Transcribe, etc. The text may then be interpreted by user experience design generator 102 using natural language processing to map the keywords used by user 101 to commands. Such words may be mapped to commands using a data structure (e.g., table) stored in a storage device (e.g., memory, disk drive) of user experience design generator 102 or in repository 105. In one embodiment, such a data structure includes a listing of words mapped to a listing of commands. Upon identifying a matching command to the word spoken by user 101, user experience design generator 102 then executes the command.

If user experience generator 102 received user feedback to modify the user experience design, then, in step 413, user experience design generator 102 modifies the user experience design as discussed above.

Upon modifying the user experience design or if user experienced design generator 102 did not receive any user feedback to modify the user experience design, then, in step 414, user experience design generator 102 issues the user experience design approved by the user (i.e., after the user has modified the user experience design or has approved the user experience design that was previously reviewed by the developer) to the developer (i.e., the developer of computing device 104) to develop the code to implement the user experience design.

As a result of the foregoing, embodiments of the present disclosure provide a means for creating user experience designs that are used to create products that provide meaningful and relevant experiences to users by deriving user experience flows from gathered requirements of the user experience design and deriving user interface elements and components based on the derived user experience flows and theme selected by the user.

Furthermore, the principles of the present disclosure enable the user experience design process to gather information to determine users' requirements in creating the user experience design. Furthermore, the principles of the present disclosure enable the user experience design process to create the user experience design taking into consideration the user's emotions and thought processes. Additionally, the principles of the present disclosure enable the user experience design process to discover user interface elements and components which align with such users' requirements and thought processes.

Furthermore, the present disclosure improves the technology or technical field involving user experience designs. As discussed above, user experience (UX) design is the process of supporting user behavior through usability, usefulness, and desirability provided in the interaction with a product. User experience design encompasses traditional human-computer interaction (HCI) design and extends it by addressing all aspects of a product or service as perceived by users. In other words, UX design is the process of designing (digital or physical) products that are useful, easy to use, and delightful to interact with. Such UX designs are used by design teams to create products that provide meaningful and relevant experiences to users. Currently though such UX design processes have difficulty in gathering information to determine users' requirements in creating the UX design. Furthermore, such UX design processes fail to create the UX design taking into consideration the user's emotions and thought processes. Additionally, such UX design processes fail to discover user interface elements which align with such users' requirements and thought processes. As a result, the currently created UX designs cannot effectively be used to create products that provide meaningful and relevant experiences to users.

Embodiments of the present disclosure improve such technology by gathering user requirements for creating user experience designs. In one embodiment, such user requirements pertain to a defined business goal or problem/opportunity statement provided by a user. After gathering the user requirements, such user requirements are analyzed in connection with historical user experience designs. A user experience flow is then derived based on these analyzed gathered user requirements. A "user experience flow," as used herein, refers to a diagram that displays the complete path a user takes when using a product. The complete path may include steps performed by the user when using a product, such as a computing device to purchase an item sold on a website. In one embodiment, those historical user experience designs with a greater number of matching user requirements may be selected to be used to derive user experience flows over those with fewer number of matching user requirements. Furthermore, a theme for a user experience design is received. A "theme," as used herein, refers to the idea in or pervades the user experience design. For example, the user may select the theme of "flowers" in which user interface elements and components may include different flowers. Additionally, a sketch (e.g., paper sketch) is received from a user, which is transformed into a wireframe. A "wireframe," as used herein, is a diagram or a set of diagrams that consists of simple lines and shapes, such as representing a sketch provided by a user. For example, such a sketch could be an outline of a webpage or application. User interface elements and components are then derived based on the derived user experience flows and the received user selected theme. A user experience design is then generated in the wireframe based on these derived user interface elements and components. In this manner, the embodiments of the present disclosure provide a means for creating user experience designs that can be used to create products that provide meaningful and relevant experiences to users. Furthermore, in this manner, there is an improvement in the technical field involving user experience designs.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for creating user experience designs, the method comprising:
gathering user requirements for creating user experience designs;
analyzing said gathered user requirements in connection with historical user experience designs;
deriving a user experience flow based on said analyzed gathered user requirements;
receiving a theme for a user experience design;
receiving a sketch of a user interface;
transforming said sketch of said user interface into a wireframe;
deriving user interface elements and components based on said derived user experience flow and said received theme for said user experience design; and
generating said user experience design in said wireframe based on said derived user interface elements and components.

2. The method as recited in claim 1 further comprising:
updating said generated user experience design in response to receiving instructions from a developer to update said generated user experience design.

3. The method as recited in claim 2 further comprising:
presenting said updated user experience design to a user.

4. The method as recited in claim 3 further comprising:
receiving feedback from said user to further update said updated user experience design.

5. The method as recited in claim 4 further comprising:
modifying said updated user experience design in response to said feedback received from said user.

6. The method as recited in claim 5 further comprising:
issuing said modified user experience design to said developer to develop code to implement said user experience design.

7. The method as recited in claim 1 further comprising:
issuing said user experience design to a developer to develop code to implement said user experience design.

8. A computer program product for creating user experience designs, the computer program product comprising one or more computer readable storage mediums having program code embodied therewith, the program code comprising programming instructions for:
gathering user requirements for creating user experience designs;
analyzing said gathered user requirements in connection with historical user experience designs;
deriving a user experience flow based on said analyzed gathered user requirements;
receiving a theme for a user experience design;
receiving a sketch of a user interface;
transforming said sketch of said user interface into a wireframe;
deriving user interface elements and components based on said derived user experience flow and said received theme for said user experience design; and
generating said user experience design in said wireframe based on said derived user interface elements and components.

9. The computer program product as recited in claim 8, wherein the program code further comprises the programming instructions for:
updating said generated user experience design in response to receiving instructions from a developer to update said generated user experience design.

10. The computer program product as recited in claim 9, wherein the program code further comprises the programming instructions for:
presenting said updated user experience design to a user.

11. The computer program product as recited in claim 10, wherein the program code further comprises the programming instructions for:
receiving feedback from said user to further update said updated user experience design.

12. The computer program product as recited in claim 11, wherein the program code further comprises the programming instructions for:

modifying said updated user experience design in response to said feedback received from said user.

13. The computer program product as recited in claim 12, wherein the program code further comprises the programming instructions for:

issuing said modified user experience design to said developer to develop code to implement said user experience design.

14. The computer program product as recited in claim 8, wherein the program code further comprises the programming instructions for:

issuing said user experience design to a developer to develop code to implement said user experience design.

15. A system, comprising:

a memory for storing a computer program for creating user experience designs; and
  a processor connected to said memory, wherein said processor is configured to execute program instructions of the computer program comprising:
    gathering user requirements for creating user experience designs;
    analyzing said gathered user requirements in connection with historical user experience designs;
    deriving a user experience flow based on said analyzed gathered user requirements;
    receiving a theme for a user experience design;
    receiving a sketch of a user interface;
    transforming said sketch of said user interface into a wireframe;
    deriving user interface elements and components based on said derived user experience flow and said received theme for said user experience design; and
    generating said user experience design in said wireframe based on said derived user interface elements and components.

16. The system as recited in claim 15, wherein the program instructions of the computer program further comprise:

updating said generated user experience design in response to receiving instructions from a developer to update said generated user experience design.

17. The system as recited in claim 16, wherein the program instructions of the computer program further comprise:

presenting said updated user experience design to a user.

18. The system as recited in claim 17, wherein the program instructions of the computer program further comprise:

receiving feedback from said user to further update said updated user experience design.

19. The system as recited in claim 18, wherein the program instructions of the computer program further comprise:

modifying said updated user experience design in response to said feedback received from said user.

20. The system as recited in claim 19, wherein the program instructions of the computer program further comprise:

issuing said modified user experience design to said developer to develop code to implement said user experience design.

\* \* \* \* \*